United States Patent
Kao

(10) Patent No.: US 6,285,981 B1
(45) Date of Patent: Sep. 4, 2001

(54) SPEED UP SPEECH RECOGNITION SEARCH USING MACRO EVALUATOR

(75) Inventor: Yu-Hung Kao, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/326,289

(22) Filed: Jun. 7, 1999

Related U.S. Application Data

(60) Provisional application No. 60/091,289, filed on Jun. 30, 1998.

(51) Int. Cl.[7] ..................................................... G10L 15/14

(52) U.S. Cl. ............................ 704/256; 704/231; 704/255
(58) Field of Search ..................................... 704/231, 255, 704/256

Primary Examiner—Richemond Dorvil
Assistant Examiner—Susan McFadden
(74) Attorney, Agent, or Firm—Robert L. Troike; Frederick J. Telecky, Jr.

(57) ABSTRACT

A speed up speech recognition search method is provided wherein the number of HMM states is determined and a microslot is allocated for Hidden Markov Models (HMMs) below a given threshold level of states. A macroslot treats a whole HMM as a basic unit. The lowest level of macroslot is a phone. If the number of states exceeds the threshold level a microslot is allocated for this HMM.

9 Claims, 2 Drawing Sheets

SPEED UP SPEECH RECOGNITION SEARCH USING MACRO EVALUATOR

This application claims priority under 35 USC § 119(e)(1) of provisional application No. 60/091,289, filed Jun. 30, 1998.

TECHNICAL FIELD OF THE INVENTION

This invention relates to speech recognition and more particularly to speed up recognition using macro evaluator.

BACKGROUND OF THE INVENTION

Speech recognition involves searching and comparing the input speech to speech models representing vocabulary to identify words and sentences as shown in FIG. 1.

The search speed for large vocabulary speech recognition has been an active research area for the past few years. Even on the state-of-the-art workstation, search can take hundreds of times real time for a large vocabulary task (20K words). Most of the fast search algorithms involve multi-passes of search. Namely to use simple models (e.g. monophones) to do a quick rough search and output a much smaller N-best sub-space; then use detailed models (e.g. clustered triphones with mixtures) to search that sub-space and output the final results (see Fil Alleva et al. "An Improved Search Algorithm Using Incremental Knowledge for Continuous Speech Recognition," ICASSP 1993, Vol 2, 307–310; Long Nguyen et al. "Search Algorithms for Software-Only Real-Time Recognition with Very Large Vocabulary," ICASSP; and Hy Murveit et al. "Progressive-Search Algorithms for Large Vocabulary Speech Recognition," ICASSP). The first pass of using monophones to reduce the search space will introduce error, therefore the reduced search space has to be large enough to contain the best path. This process requires a lot of experiments and fine-tuning.

The search process involves expanding a search tree according to the grammar and lexical constraints. The size of the search tree grows exponentially with the size of the vocabulary. Viterbi beam search is used to prune away improbable branches of the tree; however, the tree is still very large for large vocabulary tasks.

Multi-pass algorithm is often used to speed up the search. Simple models (e.g. monophones) are used to do a quick rough search and output a much smaller N-best subspace. Because there are very few models, the search can be done much faster. However, the accuracy of these simple models are not good enough, therefore a large enough N-best subs space has to be preserved for following stages of search with more detailed models.

Another process is to use lexical tree to maximize the sharing of evaluation. See Mosur Ravishankar "Efficient Algorithms for Speech Recognition," Ph.D. thesis, CMU-CS-96–143, 1996. Also see Julian Odell "The Use of Context in Large Vocabulary Speech Recognition," Ph.D. thesis, Queens' College, Cambridge University, 1995. For example, suppose both bake and baked are allowed in a certain grammar node, much of their evaluation can be shared because both words start with phone sequence: /b/ /ey/ /k/. If monophones are used in the first pass of search, no matter how large the vocabulary is, there are only about 50 English phones the search can start with. This principle is called lexical tree because the sharing of initial evaluation, and then the fanning out only when phones differ looks like a tree structure. The effect of lexical tree can be achieved by removing the word level of the grammar, and then canonicalize (remove redundancy) the phone network. For example:

```
% more simple.cfg
start (<S>).
<S>→bake | baked.
bake →b ey k.
baked →b ey k t.
% cfg_merge simple.cfg | rg_from_rgdag |\
    rg_canonicalize
start(<S>).
<S>→b, Z_1.
Z_1→ey, Z_2.
Z_2→k, Z_3.
Z_3→t, Z_4.
Z_3→" ".
Z_4→" ".
```

The original grammar has two levels: sentence gramar in terms of words, and pronunciation grammar (lexicon) in terms of phones. After removing the word level and then canonicalizing the one level phone network, same initial will be automatically shared. The recognizer will output phone sequence as the recognition result, which can be parsed (text only) to get the word. Text parsing takes virtually no time compared to speech recognition parsing.

It is desirable to provide a method to speed up the search that does not introduce error and can be used independently of multi-pass search or lexical tree.

SUMMARY OF THE INVENTION

In accordance with one embodiment of the present invention, faster search time and less search space is provided by treating a whole HMM as an integral unit in the search network.

DESCRIPTION OF PREFERRED EMBODIMENTS OF THE PRESENT INVENTION

Figure 1:
FIG. 1 is an overall block diagram according to the prior art.
Figure 2:
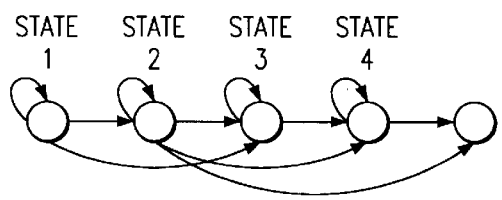
FIG. 2 illustrates an HMM.

The traditional method of speech recognition follows and is referred herein as micro evaluation. In the Hidden Markov Model (HMM frame work, sentence grammar, lexicon (pronunciation grammar), and the temporal modeling of phonetic models are all represented by HMM's. HMM describes how states can transfer to other states, with what probabilities (see FIG. 2). Observations of an HMM are associated with the states or transitions, which point to the lower level of HMM's; which are themselves HMM's with observations pointing to yet another lower level of HMM's. HMM structure is defined layer by layer from the top a to sentence level grammar to word level, to the phoneme level to the bottom acoustics. The arrows in FIG. 2 represent transitions from one state to another. If it stays in state beyond a certain time period (a speech frame), it is represented by the top arrow back on the state itself. If regular speed, then to the adjacent state (state 1 to state 2). If faster than regular speed, it skips states (state 1 to state 3).

Figure 3:
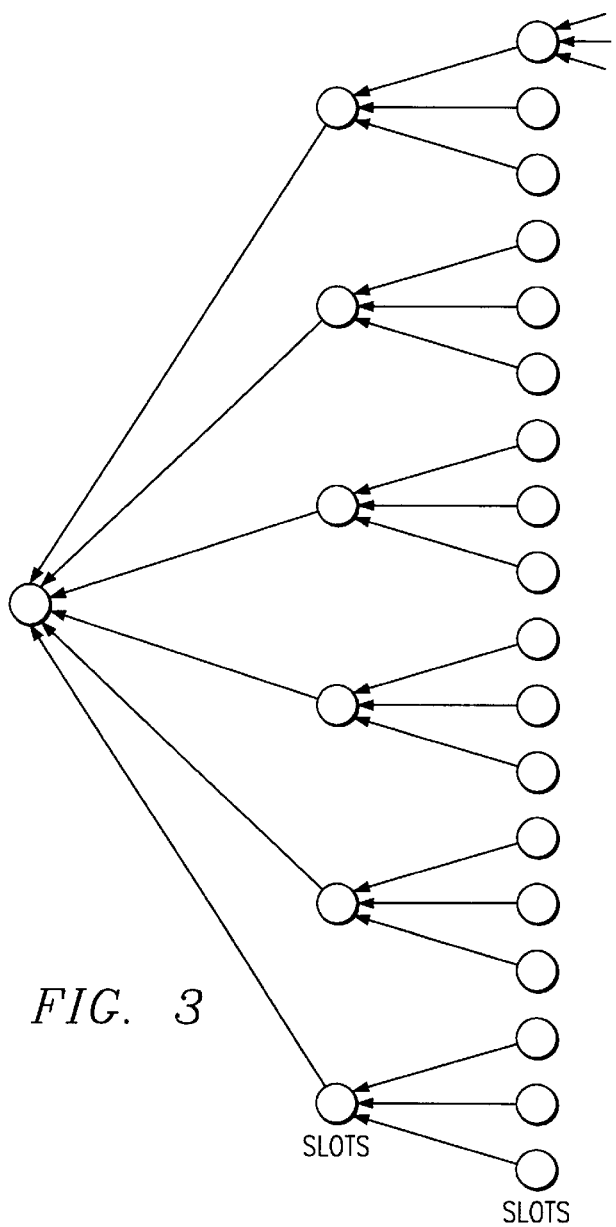
FIG. 3 illustrates path expansion slots and pointers back to previous sds.

Search is expanding all the possible paths in the grammar (see FIG. 3). When a speech frame comes in, first we expand all the possible word in the sentence HMM. To expand each word, we need to expand their individual phone sequence in the lexicon HMM. To expand each phone, we need to expand their phonetic HMM's, which has acoustics as the observations. There are three levels of HMM in the structure. The upper level transitions may take more than one speech frame, only the bottom level transitions consume exactly one speech frame. A speech frame is, for example, 20 milliseconds long. The upper level transition can be taken only after its corresponding observation is completed (which may take several speech frames).

If word models are used, the above structure is reduced to two levels. Word models means that each word is an HMM with acoustic observations. There is no need for the phonetic pronunciation layer.

In expanding the search network, we define a scoring data structure (sds) to maintain the dynamically growing network. One sds or slot or memory space is created for a state (in all levels of HMM's). For every frame (20 ms, for example) we allocate a slot (sds) to represent a search tree node. Each sds contains eight items:

```
struct sds {
    struct state *state;
        /* HMM state this sds associated with */
    float score;
        /* accumulated path score */
    struct sds *back_ptr;
        /* previous sds in the path */
    int init-time;
        /* the time the sds was created */
    int last_time;
        /* the time the sds was last updated */
    struct sds *next_sds;
        /* the next live sds in this model */
    struct sds *obs_sds;
        / the observation sds (lower level) */
    char *sup_char;
        /* supervision string */
```

State points to the HMM state this sds corresponds to, so we know what model and state this sds represents. Score is the accumulated probability score for this path, so we can do Vitervi decoding, where for each state we only keep the best path leading into it. Back_ptr (back pointer) points to the previous sds in this path, so the whole path can be backtraced at the end. Init_time is the time when this sds was first created, so we know at what time a state is mapped. Last_time is the time this sds is last updated. If the path is alive (within the search beam), all the sds's in this path will have their last_time updated to the current time stamp. This means that they need to be preserved. If the last_time of an sds is not current time, it can be reused because it is not on a live path. This is how the garbage collection of the sds inventory is done. Next_sds is the next live sds in this model, so the list of all live sds's can be evaluated (path extended) for this model. Obs_sds is the observation sds that points to the sds at the next lower level HMM. Only after the observation evaluation is completed can the sds at this level be extended. Sup_char is the supervision string.

One can use a different data structure to maintain the search network. However, it will be more or less the same size because all the above information needs to be maintained.

We call this algorithm micro evaluation because the microscopic detail of the search path is maintained.

Although only the word output is needed, the search provides the mapping is of each input speech frame to a model state. The microscopic mapping of each speech frame is valuable for the purpose of model training and error analysis. However, for the speech recognition purpose where only the word output is needed, it is a gross overkill.

The search is very time-consuming because:

It needs to search for an available sds for every state extension. The free sds and occupied sds are mixed in the inventory. There is no way to order them because the way they die off, so the search is linear. It is very expensive.

The backtrace to update the time stamp for all the sds's in the live path needs to be done at every state extension, which is very expensive.

The backtrace problem is partly solved by multi-pass algorithm because it does not need to maintain the whole path in the earlier N-best passes. The first pass will output the end times of different words from different paths within the N-best beam during the search. There is no best path to be backtraced at the end. Therefore, the old sds's in a path can be discarded because the information has been outputted already. However, we are not discussing the multi-pass algorithm in this application. We are targeting general search where the whole path does have to be maintained until the end.

From the time profiling we can see how the computation time is attributed to different routines. The following table is the percentage of time spent in each routine, not including the descendants' time. It was calibrated on a 655 company name recognition task.

| | |
|---|---|
| 30.63% | Hmm1_eval |
| 9.60% | Propagate_time |
| 7.09% | Frm1_eval |
| 5.91% | Fsa1_eval |
| 5.40% | Fsa2_eval |
| 5.34% | Get_sds |
| 4.03% | _read |

There are four kinds of models and their associated evaluation functions: fsa1 (Finite State Automata, type 1), an HMM whose observations are associated with states. fsa2, an HMM whose observations are associated with transitions. hmm1, an fsa1 whose observations are acoustic distributions (bottom layer of the HMM structure). frm1, the acoustic distribution models. The frm1 evaluation is basically computing the probability for an input speech frame given the acoustic distribution. fsa1, fsa2, and hmm1 evaluations are basically expanding the search network (constructed by inter-connecting sds's) by accumulating transition probabilities and observation probabilities from lower level models.

For a typical recognition task using phonetic models, the sentence grammar is fsa2. Some of the lexicon (pronunciation grammar) are fsa1, some are fsa2. The phonetic HMM's are all hmm1 (fsa1 with acoustic as observations). Therefore, fsa2_eval() is on the top level. It calls fsa2_eval() or fsa1_eval(), which is the second level. The second level (fsa1_eval() or fsa2_eval()) calls hmm1_eval(), which is the third level. The hmm1_eval() then calls frm1_eval(), which is the fourth and bottom level. The top three levels are all HMM evaluations. The bottom level is an acoustic probability density evaluation.

The reason that hmm1_eval() takes the most time is because it is called the most times. The complexity of fsa1_eval(), fs2_eval(), and hmm1_eval() are about the same, because they are all HMM evaluations. The time of executing each of the 3 routines once is about the same.

There are two ways to reduce the time spent on hmm1_eval(). The first is the lexical tree idea. The hmm1_eval() evaluates the phonetic model HMM's, lexical tree will share the phonetic model evaluation for all the words with same initial phone sequences. This will tremendously reduce the number of times hmm1_eval() is called. The second idea is to use regular structure for phonetic model, this will reduce the control complexity of the code. As of now, because the HMM structures for different phonetic models are different, the code needs to reference and dereference different transitions and states for different phonetic HMM's for the evaluation. If the HMM structures are regular (same transitions and states, only probabilities are different), the code will not have to read the structure. The control code can then be hard-coded and be very fast. Actually, most labs use regular structure, 3 states, left to right HMM's for all phones. Variable length phonetic HMM's provide much better temporal modeling; however, more complicated structure and slower evaluation time are the price.

Other than the four evaluation functions, propagate_time() and get_sds() take up the rest of the search time. This is caused by the backtrace and the search for available sds. The get_sds() is called by all the HMM evaluation routines (fsa1_eval(), fsa2_eval(), and hmm1_eval()) because they need sds's to construct the HMM expansion networks. The propagate_time() is called by both hmm1_eval() and frm1_eval() because they are where the evaluation ends for each input frame, and they need to update the time stamp of the live paths all the way back.

This application will focus on solving these two problems. Unlike the ideas of lexical tree and regular HMM structure, which require more extensive change of the search algorithm and change of models; we teach herein macro evaluation. Macro evaluation also does not require change of models or grammars. And it does exact computation. There is no heuristic or approximation involved.

Of all the information contained in the traditional sds structure, the one field that is necessary to be preserved is score. Search is about computing scores of the possible paths and then find out the best scored path. Other than the score, we also need to know what path the score is associated with, the back pointer or back_ptr.

The score and back_ptr are the two essential information to describe the paths in a search network. All other information is not essential for the purpose of finding the best scored path.

Figures 4, 5:
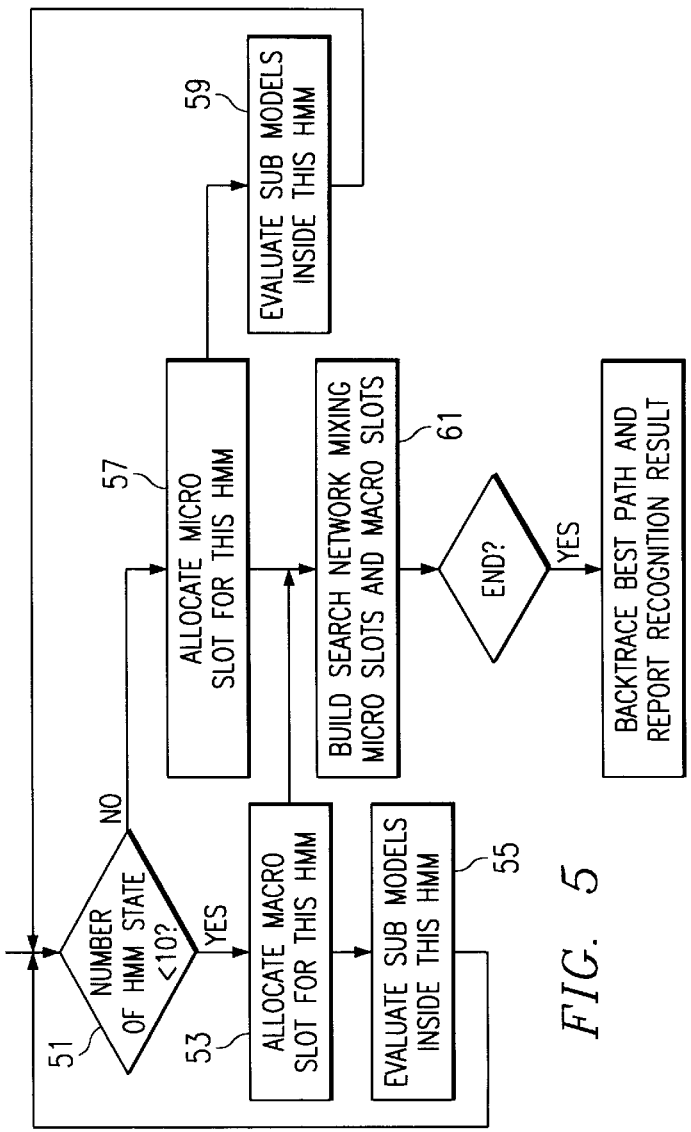
FIG. 4 illustrates the comparison between micro evaluation and macro evaluation.
FIG. 5 is a flow chart of searching according to a preferred embodiment of the present invention.

In addition, one sds per state is not necessary. Instead, applicants teach herein one sds per model, which is the definition of a macro sds. Referring to FIG. 4 there is illustrated the search space for the sentence grammar, "Call George Washington." The three layers of grammars are sentence, words and phones. Line 2 gives the phones. In micro evaluation, the search network consists of micro slots (solid line circles). The number of slots is proportional to the utterance length. In macro evaluation, the search network consists of macro slots (dashed line ovals). The number of slots is independent of utterance length. The number of macro slots is much smaller than the number of micro slots in the same evaluation; therefore, macro evaluation takes less memory and less time to compute than micro evaluation. For macro evaluation the lowest level is the phone.

A macro sds contains the following:

```
struct macro_sds {
    struct state *state;
        /* a const flag to identify macro sds */
    int last_time;
        /* the time the sds was last updated */
    float score [MAXHMMSTATE];
        /* best score for each state in this HMM */
    struct sds *back_ptr [MAXSTATE];
        /* previous sds in the path */
}
```

This macro sds is different from the traditional micro sds in that it represents a complete HMM model instead of only a state in an HMM model. The state field is a constant flag (like −1) because the search network (tree) is now composed of both micro sds's and macro sds's, and we need a flag to distinguish them. The last-time field is needed for the same reason as for the micro sds—to mark whether this macro sds is in use or not. There are two sds inventories to be maintained, one for micro sds, one for macro sds. The sds allocation and garbage collection algorithms are exactly the same, except that they are of different sizes and represent different structures.

The score and back_ptr arrays are allocated for the maxim HMM size. In our case, MAXHMMSTATE=10, the longest of our phonetic models is /oy/, which has 9 temporal states, plus a non-emitting (no observation) start state, total 10 states. This arrangement is wasteful for shorter phones, only part of the arrays will be used. The average length of our phonetic models is 4 states. However, compared to the micro sds scheme where one sds is allocated for each state, this macro sds scheme still provides huge savings. We will provide analysis to illustrate the amount of savings later. One way to avoid this uniform size waste is to use uniform size phonetic models. As mentioned above, most labs use uniform size phonetic models—3 states, left to right. In that case, MAXHMMSTATE=3+1=4, all of the arrays will be used. The disadvantage is that uniform size phonetic models do not model temporal course well. However, with enough mixtures and good acoustic precision, temporal modeling does not seem to be that crucial as proved by the performance. The importance of prosodic features (time, pitch, stress) has long been an interested research topic in the speech recognition community; however, none of the top performing systems use it.

Macro sds is used in the bottom HMM evaluation—hmm1_eval(). Therefore, obs_sds is not needed. However, the idea of macro sds can be applied in upper level HMM evaluations (fsa1_eval and fsa2_eval) as long as the maximum HMM size is reasonable. For example, the lexicon HMM can use the macro sds scheme because all the vocabulary will have pronunciation less than, say 20 phones; so MAXHMMSTATE=20. In this case, because lexicon HMM is not the bottom HMM, we need as obs_sds [MAXHMMSTATE] array in the macro sds structure. The sentence grammar HMM usually can not use the macro sds scheme because there are too many words, ie. states, in the sentence grammar HMM.

Because phonetic HMM is evaluated by far the most times, the macro sds algorithm will provide the most saving of computation when applied to phonetic HMM. When applied to lexicon HMM, although the same proportion of saving will be achieved, it is not much saving in absolute time. As illustrated in the above table: hmm1_eval() takes 30.63% of time while fsa1_eval() only takes 5.91% of time.

In the following analysis, the macro sds scheme is only applied to the hmm1_eval() level.

The macro evaluation idea reduces the search time by about 30% and the search space by about 60%. However, it comes at a price of losing some detail information in the network.

To compare the before vs. after savings of the search time, the function time profile is in real time seconds instead of percentage. It was the same calibration job—655 company name recognition, 617 utterances. The hmm1_eval() is replaced by hmm1_macor-eval(). propagate_time() is replace by propagate_time_macro().

Micro evaluation:

| | |
|---|---|
| 1644.51 | hmm1_eval |
| 515.54 | *propagate_time |
| 380.46 | *frm1_eval |
| 317.21 | fsa1_eval |
| 289.87 | fsa2_eval |
| 286.68 | get_sds |
| 216.09 | _read |
| 182.90 | frm2_like_pcov |
| 33.61 | frm2_likelihood |
| 26.66 | vfork |
| ... | |

Macro evaluation

| | |
|---|---|
| 1359.34 | hmm1_macro_eval |
| 317.21 | fsa1_eval |
| 289.87 | fsa2_eval |
| 194.76 | _read |
| 179.25 | compute_frm1_obs_score |
| 155.85 | memcpy |
| 143.38 | propagate_time_macro |
| 73.29 | get_sds |
| 50.13 | vfork |
| 34.19 | waitid |

The biggest saving comes from faster backtrace: from 515.54 seconds for propagate_time() to 143.38 seconds for propagate_time_macro(). This is because the macro backtrace traces a path of models instead of states, and there are a lot less models than states in a path. Another big saving comes from sds allocation: from 286.68 seconds to 73.29 seconds for get_sds(). This is because there are a lot less micro sds needed; and the macro sds allocation is very infrequent that it does not even show up in the top 10 time-consuming functions. The hmm1_macor_eval() also takes less time than hmm1_eval(), but not much because the code still has to reference and dereference the different structures. Regular phonetic HMM is needed to significantly reduce the time for hmm1_eval().

Other than the search time reduction, macro evaluation also provides 60% reduction in search space (memory). The count of the average number of sds's required for the evaluation, of each input speech frame:

Micro evaluation: 2.050 xRT, 14141 micro sds/frm

Macro evaluation: 1.483 XRT, 4100 micro sds/frm, 366 macro sds/frm

The size of a macro sds is about three times that of a micro sds (depending on MAXHMMSTATE). From the above numbers, you can see the 30% xRT reduction and the 60% reduction in evaluation space (sds).

The improvement of macro evaluation on different corpora using different model sets has been calibrated. Other than the 655 company name test set mentioned above, we have tested it on a 242 major U.S. city name recognition task and a NASDAQ 1000 company name recognition task. For the 655 company name and 242 city name tasks, 10K states, pooled variance 1 mixture per state models are used. For the 1000 NASDAQ company name task, 15K states, diagonal variance 4 mixtures per state models are used. The 1000 NASDAQ company name recognition task is more difficult, therefore a larger, more detailed model set is used to get good performance. The micro vs. macro evaluation time and resource comparison is tabulated as follows:

Micro Evaluation

| | 655 | 242 | 1000 |
|---|---|---|---|
| xRT | 2.050 | 1.416 | 7.505 |
| Micro sds/frm | 14141 | 9749 | 23464 |

Macro Evaluation

| | 655 | 242 | 1000 |
|---|---|---|---|
| xRT | 1.483 | 0.762 | 6.560 |
| Micro sds/frm | 4100 | 1451 | 6878 |
| Macro sds/frm | 366 | 148 | 616 |

Macro vs. Micro Improvement

| | 655 | 242 | 1000 |
|---|---|---|---|
| xRT | 28% | 46% | 13% |
| Search space | 63% | 81% | 63% |

The time improvement is computed by the ratio of xRT directly; the search space improvement is computed by the ratio of sds/frm (where macro sds is 3 times the size of micro sds). The time improvement for the 1000 NASDAQ company name task is smaller because 4 mixture models are used; therefore the acoustic evaluation requires more time. Macro evaluation does not affect the acoustic evaluation time; therefore, its overalll improvement is smaller. The improvement for 242 city name task is the largest, the search time is reduced to half; and the sds requirement is reduced to one fifth.

Referring to FIG. 5 there is illustrated the preferred embodiment of the presents invention using both micro and macro slots. The input speech is first evaluated to determine, the number of HMM states at step 51. This evaluation is done at the sentence level first. If the sentence is "Call George Washington", the answer is yes at step 51 so a macro slot is allocated for this sentence HMM at step 53. The next step 55 would be to evaluate submodels inside the sentence model. This would mean to look first at "call". Since the number of states for call is |k| |ao| |l |, there would be allocated a macro slot for "call" at step 53. Similarly, there would be macro for "George", and a macro for "Washington". The next step would be for the phone |k| which has the three HMM states represented by the three solid circles in FIG. 4. Since this is less than 10, then a macroslot is allocated for this HMM. Similarly, there is a macroslot for

|ao| and each of the other phones. Since there are no HMM states greater than 10 the macroslots for phones would be the lowest level for this input. This would take care of all long HMM states. The number of states in step 51 may be selected to be, for example, is less than 5, in that case, the number of HMM phone states in Washington would exceed four and step 51 would be no and at step 57 the system would allocate microslot for this HMM. In the evaluation of "call", the phone for |ao| would be allocated a microslot when the number of states in step 51 is set at less than 5. Likewise, where there was called the submodel step 59 there would be an allocation of microslots for |ao| in George and |aa| in Washington. The system in step 61 would build a search network mixing microslots and macroslots. Where the end is reached, the highest score represents the best path and is backtraced to get the recognition result.

Although the present invention has been described in detail, it should be understood that various changes, substitutions and alterations can be made hereto without departing from the spirit and scope of the invention as defined by the appended claims.

What is claimed is:

1. A method of speech recognition comprising the steps of:
   providing input speech;
   providing HMM models; and
   recognizing input speech by searching said HMM models in a search network of slot units to interpret the speech wherein said slot units are determined by determining the number of HMM states and allocating a macro slot for HMMs below a given threshold of states, wherein said macro slot treats a whole HMM as a slot unit.

2. The method of claim 1 wherein the lowest level macro slot is a phone.

3. The method of claim 1 further including the steps of allocating micro slot for HMM states greater than said given threshold.

4. The method of claim 1 wherein said given threshold of states is 10.

5. The method of claim 1 including the step of evaluating submodels inside the HMM for which a macro slot is allocated to determine the number of HMM states and if below said given threshold of states allocating a macro slot for the HMM state and repeating this for all submodels down through the phone level.

6. The method of claim 3 including the step of evaluating submodels inside the HMM for which a macro slot is allocated to determine the number of HMM states and if below said given threshold of states allocating a macro slot for the HMM state and repeating this for all submodels down through the phone level and the step of evaluating submodels inside the HMM for which a micro slot is allocated and if the HMM states are below said given threshold of states allocating a macro slot for the HMM state and repeating the evaluation for submodels inside the HMM state and if above said given threshold of states allocating a micro slot.

7. A method of speech recognition comprising the steps of:
   providing input speech;
   providing HMM models; and
   recognizing input speech by searching said HMM models in a search network of slot units to interpret the speech wherein said slot units include slot units greater than a speech frame when the number of HMM states are below a given threshold of states.

8. The method of claim 7 wherein said slot unit greater than a speech frame at the lowest level is a phone.

9. The method of claim 7 wherein said given threshold is 10 states.

* * * * *